This invention relates to the propagation of mammalian cells.

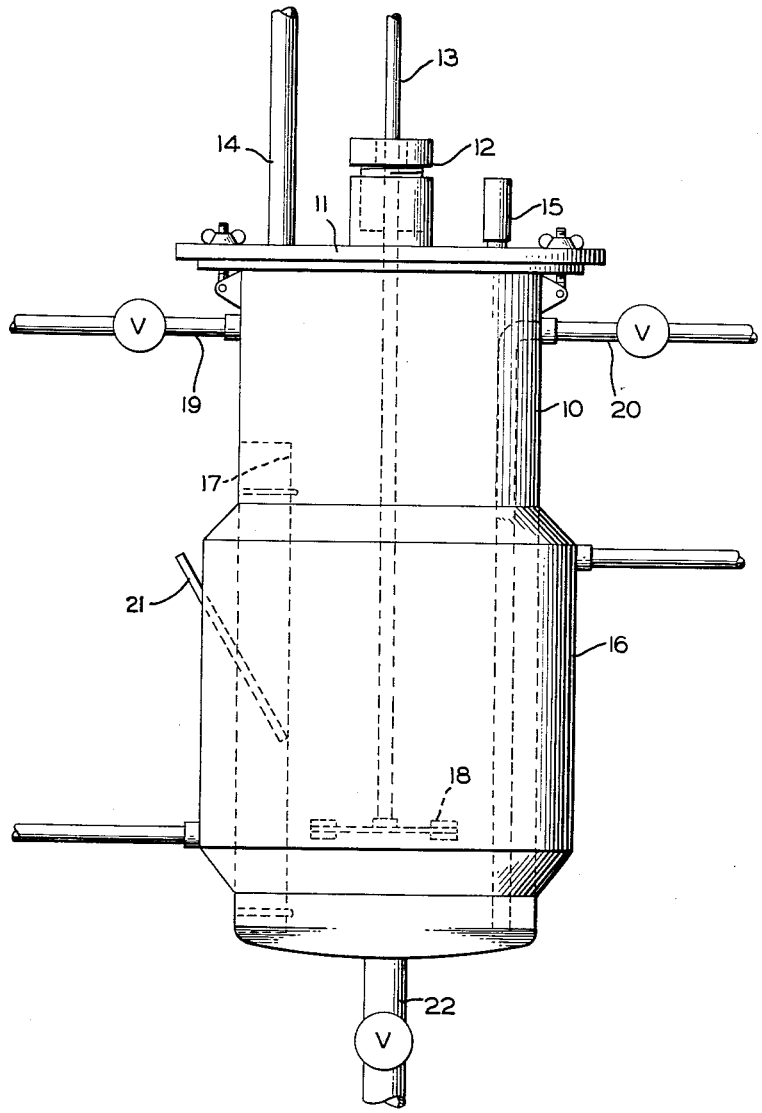
INVENTORS.
WILLIAM F McLIMANS
SAUL A. SCHEPARTZ 3,039,932
TISSUE CULTURING WITH ARGININE, CITRULLINE OR ASPARTIC ACIDS SUPPLEMENTS TO THE MEDIA
William F. McLimans, Norristown, Pa., and Saul A. Schepartz, Silver Spring, Md., assignors to Research Corporation, New York, N.Y., a non-profit corporation
Filed Jan. 7, 1958, Ser. No. 707,486
3 Claims. (Cl. 167—78)

An object of the invention is the provision of a method whereby mammalian cells may be propagated on a large scale for the economical production of physiologically active cell secretions and metabolites, or as culture media for infectious agents such as viruses.

Typically, the propagation of mammalian cells has been effected by causing the cells to grow in a monolayer on the inner surfaces of flasks and bottles containing a suitable nutrient medium. This method of propagation is suitable for laboratory investigations and has the advantage of facilitating the frequent change of nutrient medium which has heretofore been found necessary to maintain active cell proliferation in such cultures. However, this method of culture is unsuited to the propagation of cell lines on a large scale. Moreover, the frequent change of nutrient medium is expensive in both labor and materials.

We have found that mammalian cells may be continuously propagated with maintenance of sustained rates of proliferation in agitated bulk suspensions of discrete cells in nutrient media without any apparent limitation on the size of the culture vessels and without requiring change of culture medium over long periods of time by adding to the culture medium continuously or intermittently the amino acid, L-arginine, or the closely related amino acid L-citrulline, preferably at a daily rate at least equal to the amount of L-arginine in the starting culture medium. Although the added amino acid may be fed into the culture medium continuously at the selected rate, continuous addition is not necessary and the additional amino acid may be supplied intermittently at periods of up to two to three days.

Preliminary data indicate that arginine and citrulline may be replaced by aspartic acid although an induction or delay period in the growth rate may be encountered when the latter acid is used.

The arginine, citrulline or aspartic acid may be added to the culture either alone or in admixture with each other or with other amino acids or nutrient substances. When cells are being propagated for use as culture medium for a virus, for example, the addition of the arginine may advantageously be effected by withdrawing an aliquot of the cell culture for use and replacing it with an equivalent volume of the original culture medium. Likewise, when cells are being propagated for the useful secretions or metabolites produced during cell growth, aliquots of the culture medium may be withdrawn to be worked up for their content of the desired cell product and replaced by an equivalent volume of the original culture medium. Periodic addition of arginine, citrulline or aspartic acid is also useful in reducing or eliminating culture medium changes in surface layer cultures of mammalian cells.

In general, the culture media heretofore found suitable for mammalian cell and tissue culture may be used. Such culture media typically contain the known essential amino acids, mineral salts, vitamins and carbohydrate nutrients, together with a mammalian serum. Preferably fungistatic and bacteriostatic substances are added to the medium to prevent the growth of microorganisms and a small proportion of methylcellulose is also advantageous.

A suitable medium, modified from Eagle, Science 122, 501 (1955), is set forth in the following table:

*Culture Medium*

L-amino acids (grams/liter):

| | |
|---|---|
| Arginine, HCl | 0.021 |
| Cystine | 0.012 |
| Histidine, HCl | 0.008 |
| Isoleucine | 0.026 |
| Leucine | 0.026 |
| Lysine, HCl | 0.026 |
| Methionine | 0.008 |
| Phenylalanine | 0.016 |
| Threonine | 0.024 |
| Tryptophane | 0.004 |
| Tryosine | 0.018 |
| Valine | 0.024 |
| Glutamine | 0.300 |

Vitamins (mgm./liter):

| | |
|---|---|
| Biotin | 1 |
| Choline | 1 |
| Folic acid | 1 |
| Nicotinamide | 1 |
| Pantothenic acid | 1 |
| Pyridoxal | 1 |
| Thiamin | 1 |
| Riboflavin | 0.1 |

Salts (grams/liter):

| | |
|---|---|
| NaCl | 7.0 |
| KCl | 0.4 |
| $MgSO_4 \cdot 7H_2O$ | 0.2 |
| $Na_2HPO_4$ | 1.44 |

| | | |
|---|---|---|
| Glucose | grams/liter | 2.5 |
| Phenol red | do | 0.01 |
| Methylcellulose | do | 1 |
| Penicillin | units/ml | 100 |
| Streptomycin | mcg./ml | 50 |
| Mycostatin | units/ml | 30 |
| Horse serum | cc./liter | 100 |

A suitable apparatus for the large scale propagation of mammalian cells by the method of the invention is shown in the accompanying drawing which is a diagrammatic elevation of a 5-gallon stainless steel jacketed vessel which has been used in practicing the invention.

In the drawing, 10 is the body of stainless steel and 11 is a stainless steel cover, carrying a gland 12 for an impeller shaft 13, a gas exhaust line 14 and a port 15 for adding materials to the vessel. The body of the vessel is provided with a jacket 16 having suitable inlet and outlet means for heating or cooling media, and on the interior has one or more stainless steel baffles 17 and an impeller 18 carried on shaft 13.

Inlet line 19 provides for an air overlay. Line 20 can be used for sampling or to provide gassing of the culture when desired. A sampling line 21 is also provided. Valved outlet 22 is provided for withdrawing the contents of the vessel.

Inocula for the propagation of cells by the method of the invention may be obtained either from layer cultures in glass vessels or from small scale agitated submerged cultures. Layer cultures are preferably dispersed with 0.25 percent trypsin and washed with culture medium before adding to the submerged culture.

The following is an example of the culture of strain L mouse fibroblast cells of Earle et al., J. Nat. Cancer Inst. 4, 165–212 (1943):

Three liters of strain L cell suspension containing $4.9 \times 10^5$ cells/ml. and grown in the culture medium heretofore described were placed in a culture vessel of the type shown in the drawing and three liters of fresh culture medium were added. The culture was maintained at 36° to 37° C. by circulation of water from a constant temperature bath through the jacket of the vessel and the culture was stirred at a rate effective to maintain the cells in suspension without the formation of foam. A current of air was passed continuously through the vessel above the level of the culture. After four days of growth the cell suspension contained approximately $4.0 \times 10^5$ cells/ml. and an additional six liters of culture medium were added. A constant increase in the cell population resulted and was maintained over a 7-day period by three additions of Eagle's amino acid concentrates. Each addition, two days apart, was equal to the original amount of the amino acids in the fresh medium. At the end of this period the cell concentration reached $6.75 \times 10^5$ cells/ml. which represents an increase in total cells from $1.47 \times 10^9$ cells to $8.4 \times 10^9$ cells in twelve liters of cell suspension.

Similar increases in total cell content are obtained when a solution of arginine hydrochloride alone is added to the culture instead of the amino acid concentrate, the arginine content of such additions being the same as the arginine content of the amino acid concentrate.

Arginine or citrulline may be added to the culture at a rate equivalent to from about 20 to about 200 micrograms per milliliter of culture medium per day, although, in general, amounts greatly in excess of 20 micrograms per milliliter per day are not economically justified.

By the method described above the cells may be maintained in active logarithmic proliferation for periods of 10 to 20 days or longer without replacement of the culture medium.

In addition to the strain L cells described in the foregoing example, the following strains of mammalian cells have been propagated by the method of the invention:

Strain HeLa, an epithelia-type cell isolated by Gey et al. from a human cervical carcinoma, Cancer Research 12, 264–265 (1952);

A human conjunctiva cell strain isolated by Chang, Proc. Soc. Exp. Biol. Med. 87, 440–443 (1954);

A human amnion strain FL of Fogh et al., Proc. Soc. Exp. Biol. Med. 94, 523–537 (1957);

Embryonic rabbit kidney strain ERK of Sheffield et al., Brit. J. Exptl. Path. 38, 155–159 (1957);

Mouse fibroblast strain L, Earle et al., J. Nat. Cancer Inst. 4, 165–212 (1943);

Adult rabbit kidney strain R6K of Drew;

Bovine kidney strain of Stewart Madin;

Porcine kidney strain of Stewart Madin.

As an illustrative example of the production of physiologically active cell metabolites by the method of the invention, a cell line isolated from the anterior pituitary gland of a seven months human fetus was propagated as follows:

Tissue fragments carefully dissected from the anterior portion of the gland were treated with a 0.25% aqueous solution of trypsin with gentle agitation to obtain a substantial release of individual cells into the fluid. The dispersed cells were collected by centrifuging, washed and planted in Blake or Roux bottles in culture media consisting of Eagle's mixture with 10–40% of human, calf or horse serum. On incubation at 35–37° C., the individual cells settled out on the glass surfaces of the bottles and proliferated until the surface of the glass was covered with a sheet of cells. At this stage the cells are scraped from the surface, dispersed with trypsin and further propagated in bulk submerged cultures as hereinbefore described. The cell line thus established is maintained at Wistar Institute of Anatomy and Biology, Philadelphia, Pennsylvania, under the designation Wistar 6.

Pituitary growth hormones and adrenocorticotrophic hormone (ACTH) can be obtained from cultures of this cell line by freeze drying and dialysing the culture. To obtain growth hormones the lyophilized culture is suspended in distilled water, dialysed against distilled water for about 20 hours in the cold and lyophilized. The material thus obtained shows substantial growth acceleration in female hypophysectomized rats when tested in comparison with standard pituitary growth hormone.

To obtain ACTH, the lyophilized culture is suspended in aqueous acetic acid at $pH_3$ and dialysed against $pH_3$ acetic acid in the cold for about 20 hours. The dialysate is then lyophilized. The product thus obtained shows about 3 Saffran units/mg. by the Saffran-Schally method.

The embryonic rabbit kidney cells of strain ERK (Sheffield et al., supra) are particularly suitable for the propagation of poliomyelitis virus which may be treated by known methods to yield to viral vaccine for use in man. The cultivation of the virus on non-primate cells is particularly desirable. This cell line may also be used for the propagation of the adenoviruses.

The examples given above are merely illustrative of the principles of the invention which provides a useful method for the propagation of a wide variety of mammalian cells to obtain physiologically active products of the cell metabolism, to provide living mammalian cell substrates for the propagation of viruses and other infectious agents and for a wide range of experimental and test purposes such as pharmacological assaying.

We claim:

1. A method of propagating mammalian cells which comprises maintaining discrete mammalian cells in suspension in a nutrient medium containing the known essential amino acids, mineral salts, vitamins, carbohydrate nutrients and mammalian serum and maintained at about 36–37° C. and periodically adding to the medium a composition the amino acid content of which consists essentially of an amino acid selected from the group consisting of arginine, citrulline and aspartic acid at a rate effective to maintain sustained proliferation of the cells.

2. A method of propagating mammalian cells which comprises maintaining discrete mammalian cells in suspension in a nutrient medium containing the known essential amino acids, mineral salts, vitamins, carbohydrate nutrients and mammalian serum and maintained at about 36–37° C. and periodically adding to the medium a composition the amino acid content of which consists essentially of an amino acid selected from the group consisting of arginine, citrulline and aspartic acid at a rate of at least about 20 micrograms of said amino acid per milliliter of culture medium per day.

3. A method of propagating mammalian cells which comprises maintaining discrete mammalian cells in suspension in a nutrient medium containing the known essential amino acids, mineral salts, vitamins, carbohydrate nutrients and mammalian serum and maintained at about 36–37° C. and adding to the medium at least every third day of the culture period a composition the amino acid content of which consists essentially of an amino acid selected from the group consisting of arginine, citrulline and aspartic acid at a rate of at least about 20 micrograms of said amino acid per milliliter of culture medium per day.

References Cited in the file of this patent

Eagle: (I), J. Biol. Chem., vol. 214, No. 2, June 1955, pp. 839–852.

Eagle: (II), Science, vol. 122, No. 3168, September 16, 1955, pp. 501–504.

White: J. Nat. Cancer Inst., vol. 16, No. 3, December 1955, pp. 769–779.

Kuchler: PSEBM, August-September 1956, pp. 803–806.

Earle: J. of Nat. Cancer Inst., vol. 14, No. 5, April 1954, pp. 1159–1161, 1170–1171.

Bibliography of Tissue Culture, published 1953, Academic Press Inc., pp. 50, 51 and 97–98.

Chem. Abst., vol. 26, 1932, p. 5340.